March 15, 1949.    L. B. COURTOT    2,464,379
UNIVERSAL SEAL NUT
Filed Nov. 19, 1945

INVENTOR.
LOUIS B. COURTOT
BY Richey & Watts
ATTORNEYS

Patented Mar. 15, 1949

2,464,379

UNITED STATES PATENT OFFICE 2,464,379

UNIVERSAL SEAL NUT

Louis B. Courtot, Cleveland, Ohio, assignor to The Weatherhead Company, Cleveland, Ohio, a corporation of Ohio Application November 19, 1945, Serial No. 629,514

4 Claims. (Cl. 285—55)

My invention relates to sealing threaded fittings and methods of machining deformable material.

It is an object of my invention to provide an improved universal seal nut for securing a universal fitting and sealing the threaded joint thereof.

It is an object of my invention in general to prevent leakage of fluid through threaded joints, and to render threaded joints both leak-proof and corrosion resistant.

A further object of my invention is to provide a method of machining deformable material with precision.

Still another object of my invention is to form accurate screw threads in packing material such as rubber-like inserts.

A further object of my invention is to provide a rapid, reliable method of machining elastic substances accurately.

Other and further objects, features and advantages will become apparent as the description proceeds.

In carrying out my invention in accordance with a preferred form thereof for fastening a universal fitting and sealing it, I provide a sealing nut having a circular recess at one face thereof concentric with the threaded hole in the nut and containing a packing member or insert bonded to the surfaces of the nut in the recess. The insert is made of greater thickness than the depth of the recess so that it protrudes from the face of the nut, and the packing member is also provided with an opening having threads forming a continuation of the threads in the remainder of the nut. The resilient or elastic insert of packing is composed of rubber or rubber-like material, preferably a synthetic substance resistant to acid in order that the nut may be protected from corrosion by utilizing a suitable process involving an acid solution such as plating or anodizing.

In order to form an accurate screw thread in the rubber-like insert, the nut with the insert after the latter has been bonded thereto, is chilled to a temperature low enough to cause the insert to solidify. Preferably, the drill is also chilled while the hole is cut through the insert and the nut. Afterwards the nut and the insert are maintained at a low temperature while being tapped, and the tap is preferably chilled.

A better understanding of the invention will be afforded by the following detailed description considered in conjunction with the accompanying drawing and those features of the invention, which I believe to be novel and patentable, will be pointed out in the claims appended hereto.

In the drawing.

Like reference characters are utilized throughout the drawing to designate like parts.

Figure 1:
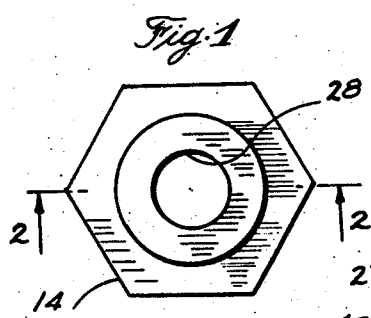
Fig. 1 is a plan view of a sealing nut for a universal fitting, forming an embodiment of my invention.
Figure 2:
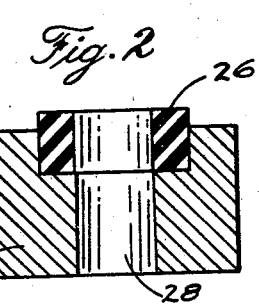
Fig. 2 is a sectional view of the device of Fig. 1 before it has been tapped.
Figure 3:
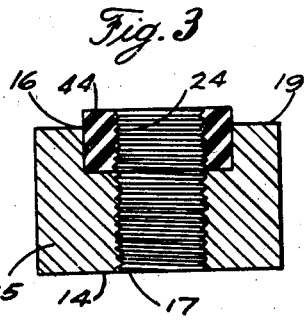
Fig. 3 is a sectional view of the finished sealing nut of Fig. 1.
Figure 6:
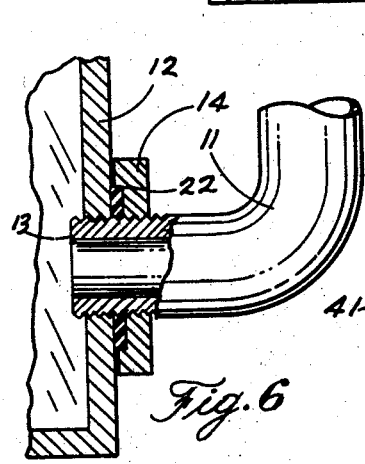
Fig. 6 is a fragmentary diagram of a universal fitting applying the sealing nut in accordance with my invention.

Referring to Fig. 6 of the drawing, in order that a threaded fitting such as an elbow 11, for example, may be mounted in any position in another part such as a bulkhead 12 having a threaded opening receiving the nipple 13 of the elbow 11, I provide a sealing nut 14 shown in greater detail in Fig. 3 having a conventional nut body 15 with a recess 16 at one face concentric with the hole in the nut and containing a threaded packing member or insert 18 of greater depth than the recess 16 so as to protrude from the nut face 19. In this manner the fitting 11 is removable without giving rise to leakage when replaced or turned to a different position, it is unnecessary to use pipe threads of the usual tapered form and no thread filling compound or cement is required to prevent leakage at the nut threads 17.

When the fitting 11 has been turned to the desired angle, the sealing nut 14 is tightened up against the surface 21 of the bulkhead 12 so as to compress the packing member or insert 18 against the surface 21 and also into the screw threads 22 and the external surface of the fitting 11. In this manner a seal is produced around the threaded joint by reason of the intimate contact of the packing material 18 with the surfaces in question.

The packing member or insert 18 is preferably composed of elastic resilient material, and preferably it is acid-resistant. It may be a rubber-like material like natural rubber or a synthetic rubber-like composition that is acid resistant. In making the nut 14, the recess 16 is formed and the insert 18 is moulded in place in the recess 16 so as to be bonded thereto. The complete nut 14 is threaded so that a continuous screw thread runs through the insert 18 and the nut body 15. In order that the portion 17 of the thread in the body 15, and the portion 24 of the thread in the insert 18 form an accurate continuation of each other and the portion 24 of the thread in the elastic material 18 will be true screw threads accurately cut, the threads in the body portion 15 of the nut 14 and the insert 18 are preferably cut in the same operation. While the machining operation is performed the insert 18 is sufficiently chilled to render it relatively rigid or substantially solidified. Although a rubber washer 26 may be bonded in a nut blank 27, already provided with an opening 28, I prefer to mold a rubber disc in a cylindrical socket in a non-perforated blank and to drill both the insert and the blank at the same time to form the opening 28.

Figure 4:
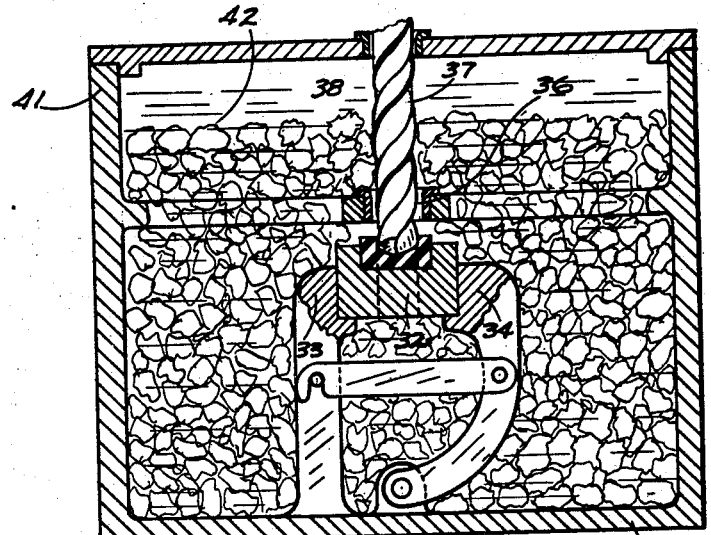
Fig. 4 is a schematic diagram illustrating the method of chilling the elastic portion of the sealing nut in accordance with my invention for the purpose of drilling the nut.
Figure 5:
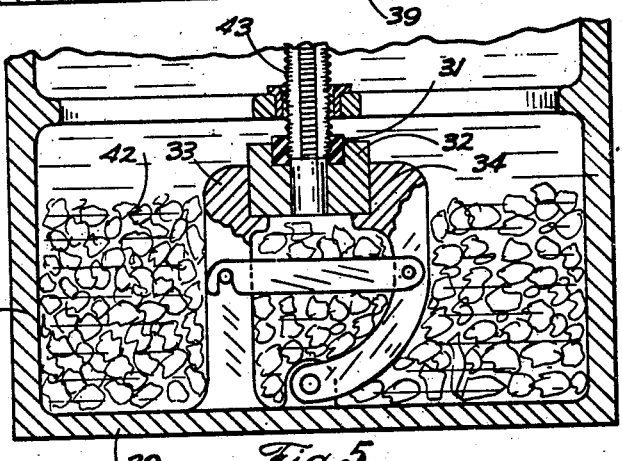
Fig. 5 is a schematic diagram corresponding with Fig. 4 illustrating the step of tapping the nut.

A suitable method for drilling and tapping the nut blank 27 in the same operation with the elastic insert is illustrated in Figs. 4 and 5. However, my invention is not limited to sealing nuts, and my method of machining materials which are elastic and deformable under normal conditions is not limited to carrying out the operations on sealing nuts.

Referring to Fig. 4, an elastic body 31 which is to be machined for example, the insert for a sealing nut, is confined within a suitable rigid member, in this case a nut blank 32 having the recess 16 into which the elastic rubber-like insert 31 has been bonded. A suitable jig is provided for holding the work and guiding the cutting tool. For example, as illustrated, a pair of clamping jaws 33 and 34, one of which is movable, are provided in the jig for holding the piece 32 supporting the elastic member 31. A jig strap 35 is provided, having an opening 36 for receiving a drill 37, a hardened bushing 38 preferably being provided in the opening 36 to protect the jig strap 35. In order to insure maintenance of the elastic member 31 at relatively low temperature during machining operations, not only the member 31 but also the entire jig and the cutting tool 37, are subjected to cooling by surrounding them with a cooling substance.

The parts to be chilled may be maintained at the desired low temperature by immersing them in a suitable fluid or a liquid which has been maintained at a low temperature by suitable refrigerating apparatus or a separate refrigerating substance. However, I prefer to avoid the employment of a liquid which may have the effect of rendering the surface of the elastic block 31 slippery, or may interfere with the cutting action of the tool 37. Accordingly, I preferably immerse the parts in a refrigeration liquid such as alcohol and I employ a refrigerant of the type which passes directly from a solid, which sinks in alcohol, to the gaseous state, such as dry ice or solidified carbon dioxide, for example.

As illustrated in Fig. 4, a jig including the clamping jaws 33, 34 and the drill guide 35 are preferably secured to a base block or a bench composed of insulating material such as wood planking 39, asbestos board, or the like, and a housing is provided composed of insulating boards or plates 41 enclosing a mass of alcohol and dry ice 42 which chills the space around the jig, the nut blank 32, the elastic insert 31 and the drill 37 so as to maintain all of these parts at a low temperature. Good thermal insulation is desirable from the standpoint of economy in the employment of the refrigerating material. The temperature is depressed sufficiently to cause the material of which the insert 18 is composed to solidify and become rigid.

After the insert 31 and the nut blank 32 have been drilled, the screw threads 24 and 17 are cut in by means of a tap 43, preferably maintaining the work, the jig, and the tool 43 at the same reduced temperature by means of the alcohol immersion dry-ice packing 42.

After the completed sealing nut with both the elastic and metal portions threaded has been removed from the dry ice, it resumes normal ambient temperature and the resilient insert 18 resumes its elastic resilient characteristics but with the thread accurately cut with the same pitch and depth as the portion of the thread 17 in the metallic body 15.

When the nut 14 is drawn against the bulkhead surface 21, the face 44 of the resilient insert bears against the bulkhead surface 21 so as to form a seal between the nut 14 and the surface 21; simultaneously the compression of the resilient insert 18 after the nut 14 is drawn against the surface 21 also forces the threaded material inward causing the threads 24 in the elastic insert 18 to contact tightly upon the threads 22 in the nipple 13. Thus a seal is formed between the nut 14 and the fitting 11. Consequently, no leakage can take place between the fitting 11 and the bulkhead 12.

For the insert 18 a natural rubber compound may be employed which becomes substantially solid or unelastic where the temperature is as low as 0° F. Preferably, however, I employ an acid-resistant compound or a synthetic packing compound whenever the sealing nut is to be anodized or coated. Such corrosion preventing treatment involves the use of an acid solution. Since such solution does not attack the insert 31, the nut may be protected against corrosion after the insert 31 has been bonded in the recess 16 without any injury to the insert 31.

Inasmuch as the threads as well as the remaining surfaces of the metallic nut body 15 are to be protected against corrosion, the corrosion treatment such as anodizing and electrolytic coating is given after the synthetic insert has been bonded to the nut and after the threads have been cut in both the insert 18 and the metallic nut body 15.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What is claimed is:

1. A universal connection comprising in combination a bulkhead having a threaded opening, a fitting having a threaded nipple rotatably mounted in said bulkhead opening, and a universal seal nut having a body of relatively rigid material with a threaded bore to fit said nipple, said body having a recess formed around its threaded bore at the face adjacent said bulkhead, a sealing element of relatively soft resilient rubber-like material disposed in the recess of said body with said element initially projecting past said body face, a peripheral portion of said element being confined by the radially outer wall of said recess, said resilient element also being threaded to fit said nipple with the threads of said resilient element having a depth substantially equal to the depth of the body threads and forming a smooth-walled continuation of the threads of said body, tightening of said nut against said bulkhead resulting in deformation of said confined resilient element to urge its threads in tight and uniform sealing engagement with the entire area of the threads of the nipple with the outer face of said element in sealing engagement with the surface of said bulkhead.

2. A universal connection comprising in combination a flat bulkhead having a threaded opening, a fitting having a threaded nipple rotatably mounted in said bulkhead opening, and a universal seal nut having a body of relatively rigid material with a threaded bore to fit said nipple, said body having a recess formed around its threaded bore at the face adjacent said bulkhead, a sealing element of relatively soft resilient material disposed in the recess of said body and bonded to said body with said element initially projecting past said body face, a peripheral portion of said element being confined by the radially outer wall of said recess, said resilient element also being threaded to fit said nipple with the threads of said resilient element having a depth substantially equal to the depth of the body threads and forming a smooth-walled continuation of the threads of said body, tightening of said nut against said bulkhead resulting in deformation of said confined resilient element to urge its threads in tight and uniform sealing engagement with the entire area of the threads of the nipple with the outer face of said element in sealing engagement with the surface of said bulkhead.

3. A sealing nut having a body of relatively rigid material with a threaded bore, said body having a recess formed around its threaded bore at one face adjacent said bulkhead, a sealing element of relatively soft rubber-like material disposed in the recess of said body with said element initially projecting past said body face, a peripheral portion of said element being confined by the radially outer wall of said recess, said resilient element also being threaded with the threads of said resilient element having a depth substantially equal to the depth of the body threads and forming a smooth-walled continuation of the threads of said body.

4. A sealing nut having a body of relatively rigid material with a threaded bore, said body having a recess formed around its threaded bore at one face adjacent said bulkhead, a sealing element of relatively soft resilient material bonded in the recess of said body with said element initially projecting past said body face, a peripheral portion of said element being confined by the radially outer wall of said recess, said resilient element also being threaded with the threads of said resilient element forming a continuation of the threads of said body.

LOUIS B. COURTOT.

REFERENCES CITED

The following references are of record in the file of this patent:

UNITED STATES PATENTS

| Number | Name | Date |
|---|---|---|
| 135,864 | Thomkson | Feb. 11, 1873 |
| 189,984 | Writht | Apr. 24, 1877 |
| 244,256 | Kendall | July 12, 1881 |
| 248,975 | Wooten | Nov. 1, 1881 |
| 552,408 | Barnes | Dec. 31, 1895 |
| 1,006,623 | Barrett | Oct. 24, 1911 |
| 1,156,892 | Clement | Oct. 19, 1915 |
| 1,602,248 | Page | Oct. 5, 1926 |
| 1,710,211 | Gammeter | Apr. 23, 1929 |
| 1,742,722 | Olsson | Jan. 7, 1930 |
| 2,167,215 | Leary | July 25, 1939 |
| 2,203,937 | Barley | June 11, 1940 |
| 2,324,737 | Stevens | July 20, 1943 |
| 2,342,425 | Parker | Feb. 22, 1944 |
| 2,373,253 | Martin | Apr. 10, 1945 |